(12) United States Patent
Ebi et al.

(10) Patent No.: US 8,219,329 B2
(45) Date of Patent: Jul. 10, 2012

(54) THERMAL TYPE MASS FLOW METER, AND THERMAL TYPE MASS FLOW CONTROL DEVICE

(75) Inventors: Hiroyuki Ebi, Kyoto (JP); Tetsuo Shimizu, Kyoto (JP); Hitoshi Kitagawa, Kyoto (JP); Shuji Moriya, Tokyo (JP); Tsuneyuki Okabe, Tokyo (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 596 days.

(21) Appl. No.: 12/295,037

(22) PCT Filed: May 23, 2007

(86) PCT No.: PCT/JP2007/060484
§ 371 (c)(1),
(2), (4) Date: Jul. 24, 2009

(87) PCT Pub. No.: WO2007/138941
PCT Pub. Date: Dec. 6, 2007

(65) Prior Publication Data
US 2011/0125445 A1 May 26, 2011

(30) Foreign Application Priority Data
May 26, 2006 (JP) .................. 2006-146512

(51) Int. Cl.
*G01F 1/00* (2006.01)
*G01F 1/12* (2006.01)

(52) U.S. Cl. .......................................... 702/45; 702/100

(58) Field of Classification Search ..................... 702/45, 702/100
See application file for complete search history.

(56) References Cited

U.S. PATENT DOCUMENTS

| 2003/0234044 A1* | 12/2003 | Shajii et al. ................. 137/487.5 |
| 2007/0174016 A1* | 7/2007 | Ding et al. ...................... 702/100 |
| 2007/0219650 A1* | 9/2007 | Wang et al. ...................... 700/73 |

FOREIGN PATENT DOCUMENTS

| JP | 2-21729 | 5/1990 |
| JP | 11-325999 | 11/1999 |
| JP | 3229138 | 9/2001 |
| JP | 3308480 | 5/2002 |
| JP | 2004-093179 | 3/2004 |

* cited by examiner

*Primary Examiner* — Michael Nghiem
*Assistant Examiner* — Manuel Rivera Vargas

(57) ABSTRACT

A thermal mass flow meter and a thermal mass flow control device addresses a thermal siphon error, even if they are in a compact and inexpensive structure, without using a flow path converting block. A control computing process portion is configured to correct a measurement error caused by thermal siphon by calculating a correction value based on a measurement value at time of depressurizing fluid flow path and flow rate measuring conduit to an atmospheric pressure or less, a difference between the measurement value and a measurement value at time of charging an actual fluid into the flow rate measuring conduit, kind of the actual fluid, pressure at time of charging the actual fluid, and flow ratio of the fluid flowing in the fluid flow path and the flow rate measuring conduit, storing the correction value, and correcting an actual measured output flow value by the stored correction value.

9 Claims, 8 Drawing Sheets

(A)

(B)

(C)

(A)

(B)

(C)

(A)

(B)

(C)

THERMAL TYPE MASS FLOW METER, AND THERMAL TYPE MASS FLOW CONTROL DEVICE

TECHNICAL FIELD

The present invention relates to a thermal type mass flow meter (hereinafter, refer to as "MFM") and a thermal type mass flow control device (hereinafter, refer to as "MFC") which are used for measuring a flow rate of a fluid such as a reactive gas, a carrier gas or the like fed to various manufacturing processes, for example, a semiconductor manufacturing process, a liquid crystal manufacturing process and the like.

BACKGROUND ART

In this kind of MFM and MFC, a vertical positional relationship is not generated between a pair of thermal type sensors as far as a sensor arranged portion of a flow rate measuring conduit in a thermal type mass flow meter sensor portion is horizontal, a thermal siphon phenomenon is not generated, and a measurement error (an indication error) is not generated under the influence of the thermal siphon phenomenon.

However, there are many cases that it is necessary to install a main body block in such a vertical posture that a fluid flow path in an inner portion thereof has a perpendicular portion so as to use, based on a constructional relation of a piping system, a relation of an installation space of the MFM and MFC, or the like. At a time of installing and using in such a vertical posture or an inclined posture, since a pair of sensors of the flow rate measuring conduit in the thermal type mass flow sensor portion have a vertical positional relationship, a thermal siphon phenomenon is generated, so that an error is generated in a measurement result of the flow rate due to the influence.

As the MFM which is developed for the purpose of lowering the measurement error caused by the thermal siphon phenomenon mentioned above, there has conventionally known a structure made such that a pair of sensors are positioned within the same horizontal surface even in the case that a main body block is installed in a vertical posture, by interposing a flow path converting block converting a flow path in which a fluid flows at 90 degrees between the main body block and the thermal type mass flow sensor portion, and arranging the flow rate measuring conduit in the thermal type mass flow sensor portion orthogonal to a fluid flow path in an inner portion of the main body block (for example, refer to Patent Document 1).

Patent Document 1: Japanese Utility Model No. 2589318

DISCLOSURE OF THE INVENTION

Problem to be Solved by the Invention

In the case of the conventional MFM as mentioned above, it is possible to prevent the measurement error from being generated by the influence of the thermal siphon phenomenon while keeping the sensor arranged portion of the flow rate measuring conduit in the flow rate sensor portion substantially horizontal, or lower as much as possible, in spite of the installed posture of the main body block, however, since the flow rate measuring conduit in the flow rate sensor portion is arranged so as to be orthogonal to the main body block and the sensor portion protrudes to the lateral side of the main body block, a space waste is generated. In addition, since the flow path converting block is interposed, a whole of the measuring meter including the sensor portion tends to be bulky and enlarged. As a result, there is a problem that the installed place is limited. Further, in the case of only converting the flowing direction of the fluid at 90 degrees, there has been yet a case that the sensor arranged portion of the flow rate measuring conduit becomes perpendicular or inclined, in some installed posture of the main body block. Accordingly, there has been a problem that it is not possible to say that the measurement error caused by the influence of the thermal siphon phenomenon can be completely lowered, whatever installed posture is employed.

The present invention is made by taking the actual condition mentioned above into consideration, and an object of the present invention is to provide an MFM which can lower a measurement error caused by an influence of a thermal siphon phenomenon so as to intend to improve a flow rate measurement precision and an MFC which can carry out a desired fluid control precisely and stably, while it is possible to construct a whole compactly and inexpensively with a simple structure, without using any flow path converting block.

Means for Solving the Problem

In order to achieve the above object, in accordance with the present invention, there is provided an MFM including a thermal type mass flow sensor portion which is additionally provided to a main body block having a fluid flow path in an inner portion and has a flow rate measuring conduit connected to the fluid flow path in a parallel manner and having a pair of thermal type sensors, further including:

correction value computing means for calculating a correction value based on a measurement value at a time of depressurizing the fluid flow path and the flow rate measuring conduit to at least an atmospheric pressure or less, a difference between the measurement value and a measurement value at a time of charging an actual fluid into the fluid flow path and the flow rate measuring conduit, a kind of the actual fluid, a pressure at a time of charging the actual fluid, and a flow ratio of the fluid flowing in the fluid flow path and the flow rate measuring conduit;

memory means for storing the correction value calculated by the correction value computing means; and output correcting means for correcting an actual measured output value at a time of flowing the actual fluid in the fluid flow path and the flow rate measuring conduit by the correction value read from the memory means.

Further, in accordance with the present invention, there is provided an MFC including a thermal type mass flow sensor portion which is additionally provided to a main body block having a fluid flow path in an inner portion and has a flow rate measuring conduit connected to the fluid flow path in a parallel manner and having a pair of thermal type sensors, and a fluid control portion for controlling a fluid flow rate or a pressure which is provided in an upstream side or a downstream side of the fluid flow path, further including:

correction value computing means for calculating a correction value based on a measurement value at a time of depressurizing the fluid flow path and the flow rate measuring conduit to at least an atmospheric pressure or less, a difference between the measurement value and a measurement value at a time of charging an actual fluid into the fluid flow path and the flow rate measuring conduit, a kind of the actual fluid, a pressure at a time of charging the actual fluid, and a flow ratio of the fluid flowing in the fluid flow path and the flow rate measuring conduit;

memory means for storing the correction value calculated by the correction value computing means; and control means for controlling the fluid control portion based on the correction value which is read from the memory means, the set flow rate value, and an actual measured output value at a time of flowing the actual fluid in the fluid flow path, and the flow rate measuring conduit.

Effect of the Invention

In accordance with the present invention having the feature and the structure mentioned above, it is possible to eliminate or lower the measurement error and the fluid control error caused by the influence of the thermal siphon phenomenon which is unavoidably generated at a time of installing and using the main body block in the other postures than the transverse direction such as the vertical direction, the inclined posture and the like, by carrying out an electric advance process in accordance with a procedure of the measurement in a state of depressurizing the fluid flow path and the flow rate measuring conduit to at least the atmospheric pressure or less, the measurement by charging the actual fluid to the flow rate measuring conduit, the calculation of the flow rate correction value based on the former measurement value, the difference between both the measurement values, the kind of the actual fluid, the pressure at a time of charging the actual fluid, and the flow ratio between the fluid flow path and the flow rate measuring conduit, and the storage of the correction value, and carrying out the computing process taking into consideration the flow rate correction value calculated by the advance process so as to be stored, before flowing the actual fluid so as to actually measure the mass flow rate. Accordingly, in spite that it is possible to construct the whole simple in structure, compact and inexpensive, without using the flow path converting block for converting the flowing direction of the fluid at 90 degrees, as in the conventional art mentioned above, and the installation space is small, there can be obtained an effect that it is possible to precisely measure a predetermined mass flow rate whatever installation posture the structure is used under, and it is possible to precisely and stably carry out a desired fluid control.

Figure 1:
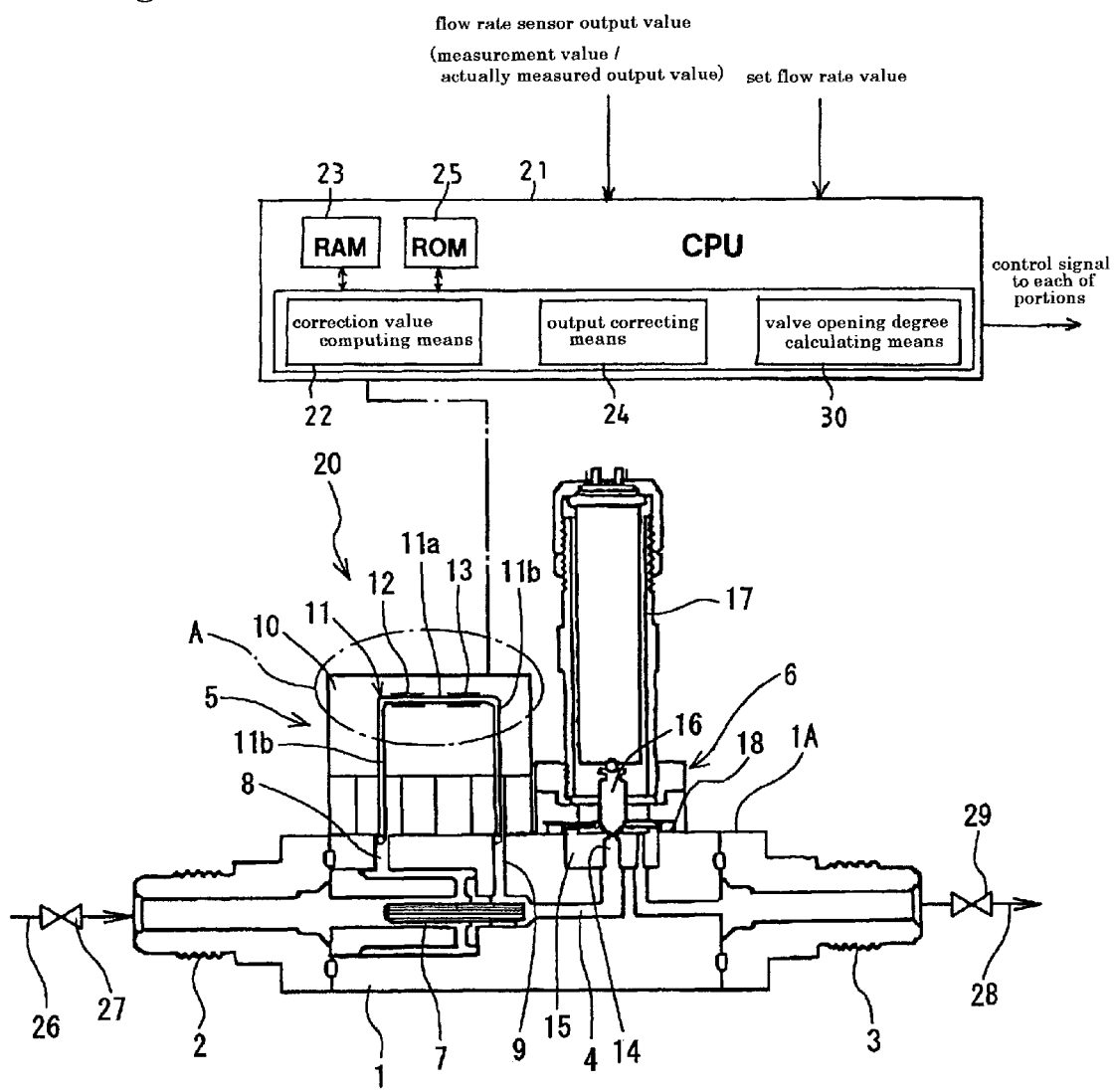
FIG. 1 is a vertical cross sectional view of a whole MFC in accordance with the present invention.

DESCRIPTION OF REFERENCE NUMERALS 1 main body block
1A outer surface of main body block
4 fluid flow path
5 thermal type mass flow sensor portion
6 fluid control portion
11 flow rate measuring conduit
12, 13 pair of self-heating type sensor coils (thermal type sensors)
20 MFC
22 correction value computing means
23 RAM (memory means)
24 output correcting means
30 MFM

BEST MODE FOR CARRYING OUT THE INVENTION

A description will be given below of an embodiment in accordance with the present invention based on the accompanying drawings.

FIG. 1 is a vertical cross sectional view of a whole of an MFC 20 in accordance with the present invention. In the drawing, reference numeral 1 denotes a main body block. A connection member 2 for a fluid inlet and a connection member 3 for a fluid outlet are attached to both ends of the main body block 1, a fluid flow path 4 is formed in a center portion of an inner portion of the main block 1 between the connection members 2 and 3, a thermal type mass flow sensor portion 5 is additionally provided at a position close to one side of the fluid flow path 4 in an outer surface 1A of the main body block 1, and a fluid control portion 6 for controlling a gas flow rate or a pressure is additionally provided at a position close to the other side of the fluid flow path 4 in a downstream side of the thermal type mass flow sensor portion 5.

A bypass portion 7 having a constant distribution ratio characteristic is provided in the fluid flow path 4 in the inner portion of the main body block 1, and in an upstream side and a downstream side thereof, there are formed flow paths 8 and 9 which are communicated with an upstream side of the fluid flow path 4 in one end side, are open to the outer surface 1A of the main body block 1 in the other end side, and are connected to the fluid flow path 4 in the downstream side.

Figure 2:
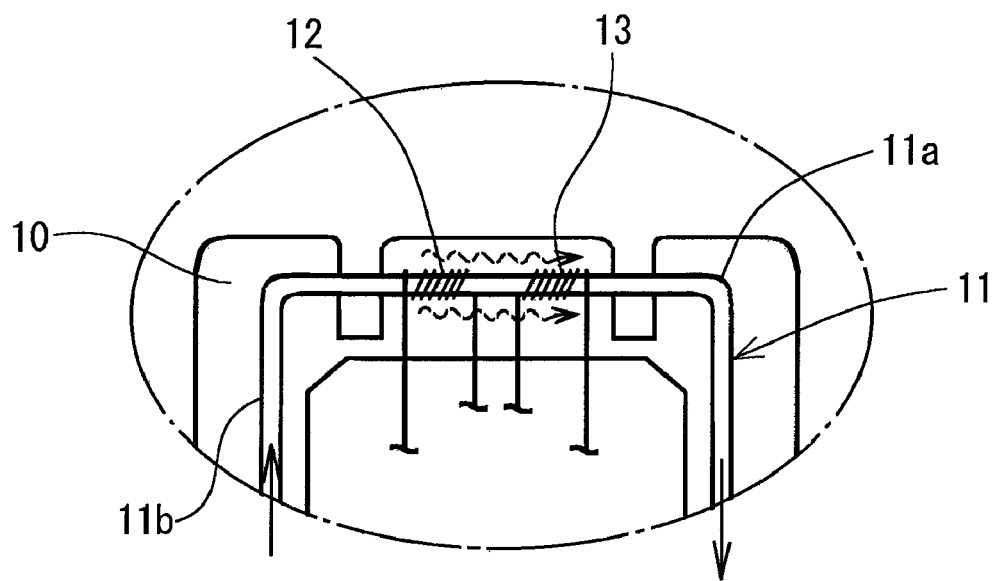
FIG. 2 is an enlarged cross sectional view in a portion A in FIG. 1.

The thermal type mass flow sensor portion 5 is provided with an approximately U-shaped flow rate measuring conduit 11, for example, constituted by a capillary, within a sensor case 10 constituted by two block bodies having such symmetrical shapes as to be connected to and disconnected from each other. The conduit 11 is constituted by a center portion 11a extending along a horizontal surface, and vertical portions 11b and 11b bent downward from both sides of the center portion 11a and positioned in parallel to each other, and the conduit 11 is connected to the fluid flow path 4 of the main body block 1 in a parallel manner by fixing the sensor case 10 to the outer surface 1A of the main body block 1 so as to homologize the lower ends of both the vertical portions 11b and 11b to the upper end openings of the flow paths 8 and 9. Further, self-heating type sensor coils 12 and 13 serving as a pair of upstream and downstream thermal type sensors are wound around the center portion 11a of the flow rate measuring conduit 11 in a state in which they are insulated from each other, as is apparently shown in FIG. 2. In this case, a pair of sensor coils 12 and 13 are connected to a bridge circuit (not shown).

Further, the fluid control portion 6 is structured such that an orifice block 15 having an orifice 14 is provided in the fluid flow path 4 portion which is in a downstream side of the bypass portion 7, and a valve body 16 opening and closing the orifice 14 is retained by a piezo stack 17 serving as a valve body drive portion via a diaphragm 18.

In the MFC 20 having the structure mentioned above, in accordance with the present invention, in order to eliminate or lower the measurement error caused by the thermal siphon phenomenon which is unavoidably generated at a time of using the main body block 1 in a vertical posture in which the fluid flow path 4 in the inner portion of the main body block 1 and the center portion 11a of the approximately U-shaped flow rate measuring conduit 11 in the thermal type mass flow sensor portion 5 are perpendicular, or an inclined posture which is an intermediate of the horizontal posture and the vertical posture, the MFC 20 is provided with, via a signal wire, a control computing process portion (hereinafter, refer to CPU) 21 outputting a flow rate control signal as well as executing a computing process before flowing an actual fluid in the MFC 20 so as to actually measure a mass flow rate thereof, thereby computing the mass flow rate. The CPU 21 is electrically connected to each of portions (the thermal type mass flow sensor portion 5, the valve body drive portion such as the piezo stack 17 or the like) of the MFC 20, and controls each of the portions.

The CPU 21 is provided with correction value computing means 22 for calculating a correction value caused by an influence of the thermal siphon phenomenon generated at a time of installing and using in the vertical posture and the inclined posture, memory means (hereinafter, refer to as RAM) 23 for storing the calculated correction value or the like, output correcting means 24 for correcting an actually measured output value (a flow rate sensor output value) by the correction value read from the RAM 23 at a time of actually measuring, memory means (hereinafter, refer to as ROM) 25 storing an error computing process program by each of the means 22, 23 and 24, and valve opening degree calculating means 30 for calculating an opening degree of the valve body 16 of the fluid control portion 6 by comparing the correction actually measured output value output from the output correcting means 24 with the flow rate set value, and outputting a control signal to the piezo stack 17 serving as the valve body drive portion.

Next, a description will be given of the correcting computation which is executed before actually measuring the flow rate by the CPU 21, and the correcting process operation of the actually measured flow rate output value based on the correction value, with reference to a flow chart shown in FIG. 3 including the fluid control operation by the fluid control portion 6.

(1) First of all, the step evacuates the bypass portion 7 and the flow rate measuring conduit 11 to a pressure [preferably a pressure lower than the atmospheric pressure in a state of being depressurized and exhausted to such a level that the fluid does not substantially flow within the fluid flow path 4 (the bypass 7) and the flow rate measuring conduit 11] at least equal to or lower than the atmospheric pressure through a fluid piping 28 connected to the downstream side of the fluid flow path 4 via the connecting member 3 in a state of closing a valve 27 interposing in a fluid piping 26 connected to the upstream side of the fluid flow path 4 in the inner portion of the main body block 1 of the MFC 20 via the connecting member 2 (step S1).

(2) The CPU 21 stores the measurement value (indication value/flow sensor output value) at a time of evacuating in the RAM 23. The measurement value at this time is approximately equal to a zero point in the horizontal posture regardless of the installed posture (the vertical posture or the inclined posture and the horizontal posture) of the main body block 1 (step S2).

(3) Next, the step opens the valve 27, and closes a valve 29 interposing in the fluid piping 28 or the valve body 16 of the fluid control portion 6 so as to charge the actual fluid into the flow rate measuring conduit 11 (step S3).

(4) The CPU 21 compares the measurement value at a time of charging the actual fluid and the measurement value (zero) at a time of evacuating to the pressure equal to or lower than the atmospheric pressure so as to determine a difference between both the values, calculates the flow rate correction value by the correction value computing means 22 based on the difference, the kind of the actual fluid, the pressure at a time of charging the actual fluid, and a flow ratio of the fluid flow path 4 and the flow rate measuring conduit 11 (they are known), and stores the calculated correction value in the RAM 23 (step S4). In this case, in this step S4, a zero correction of the thermal type mass flow sensor portion 5 may be carried out.

(5) After the correction computing process operation as mentioned above, the CPU 21 corrects the actually measured flow rate value at a time of making the MFC 20 flow the actual fluid by the correction value read from the RAM 23 in the output correcting means 24 (step S5).

(6) Further, the CPU 21 compares the corrected actually measured flow rate value output from the output correcting means 24 and input to the valve opening degree calculating means 30 with the set flow rate value previously input to the valve opening degree calculating means 30 so as to calculate the opening degree of the valve body 16 of the fluid control portion 6 (step S6), and controls to a desired fluid flow rate by outputting to the piezo stack 17 serving as the valve body drive portion based on the result so as to adjust the opening degree of the valve body 16 of the fluid control portion 6 (step S7).

In this case, a description will be given of a method of calculating the flow rate correction value with respect to the set value by the CPU 21, as follows. The correction value depends upon a form of the MFC, for example, a length, a thickness or the like of the capillary. In other words, if the pressure difference is generated in the fluid flow path 4 of the main body block 1 by opening the valves 27 and 29, a fixed flow rate of actual fluid flows in the fluid flow path 4 and the flow rate measuring conduit 11. Even at a time when the pressure difference is applied, the internal fluid within the flow rate measuring conduit 11 is warmed up by a pair of sensor coils 12 and 13 having a vertical positional relationship, a density thereof becomes low and a buoyancy is generated. As a result, a different flow rate from the fluid flow rate due to the pressure difference is generated in the flow rate measuring conduit 11 by both the pressure difference and the buoyancy.

Further, the gas flow rate flowing in the whole of the MFC 20 is calculated by a value obtained by multiplying the measurement flow rate by the thermal type mass flow sensor portion 5 of the flow rate measuring conduit 11 by the flow ratio of the fluid flow path 4 and the flow rate measuring conduit 11. Accordingly, the correction amount for correcting the actually measured flow rate depends upon not only the kind of the actual fluid and the pressure at a time of charging the actual fluid, but also the flow ratio of the fluid flow path 4 and the flow rate measuring conduit 11, and it is necessary to calculate the flow ratio, specifically, a ratio between the flow rate of the whole of the MFC 20 (the flow rate flowing in the fluid flow path 4 and the flow rate measuring conduit 11) at a time of horizontally installing and using, and the flow rate flowing in the flow rate measuring conduit 11 as a parameter.

It is possible to reflect the flow ratio between the flow rate flowing through the fluid flow path 4 and the flow rate measuring conduit 11 and the flow rate flowing through the flow rate measuring conduit 11 to the flow rate correction for lowering the measurement error caused by the thermal siphon phenomenon by including the flow ratio in the parameter, whereby it is possible to precisely carry out the actual measured flow rate correction particularly in the case of the small flow rate, in the calculation of the actually measured flow rate correction value as mentioned above.

It is possible to eliminate or lower the measurement error due to the influence of the thermal siphon phenomenon which is unavoidably generated at a time of installing and using the main body block 1 in the other postures than the horizontal posture such as the vertical posture, the inclined posture and the like, by carrying out the electric previous correction computing process described in the steps S1 to S4 by the CPU 21, and correcting the actually measured flow rate output value by the correction value calculated and stored by the correction computing process. Accordingly, it is possible to construct the whole of the MFC 20 simple in structure, compact and inexpensive without necessity of using the flow path converting block for converting the flow direction of the fluid at 90 degrees. Further, the installation space can be made small, and it is possible to precisely control a predetermined mass flow rate whatever installed posture the structure is used in.

Figure 4:
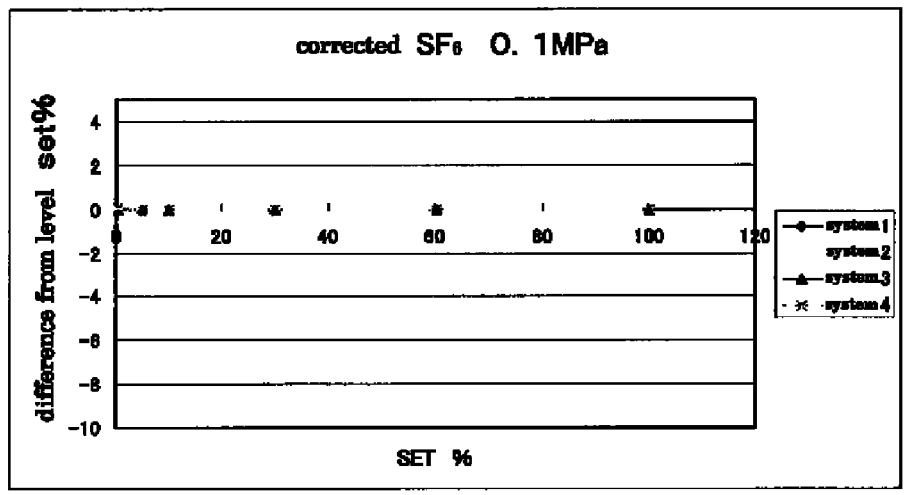
FIGS. 4(A), 4(B) and 4(C) are views showing a flow rate measurement data in the case of executing an error computing process operation in accordance with the present invention.
Figure 4:
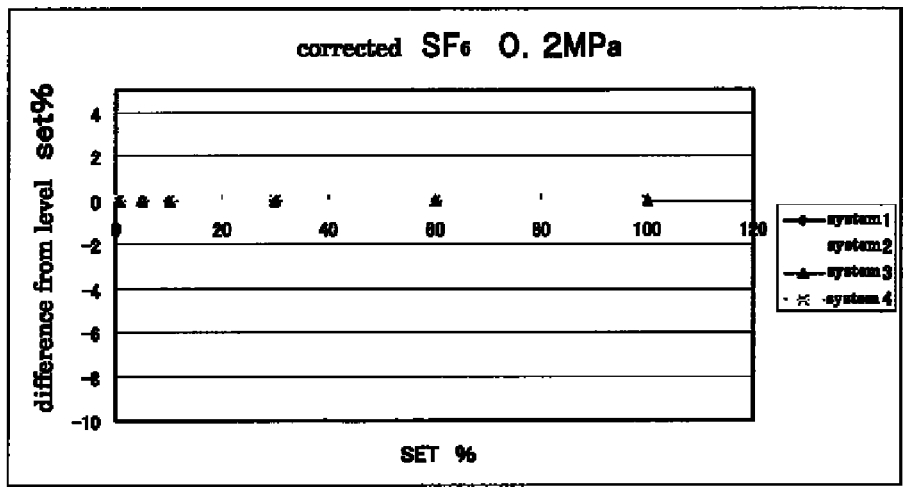
Figure 4:
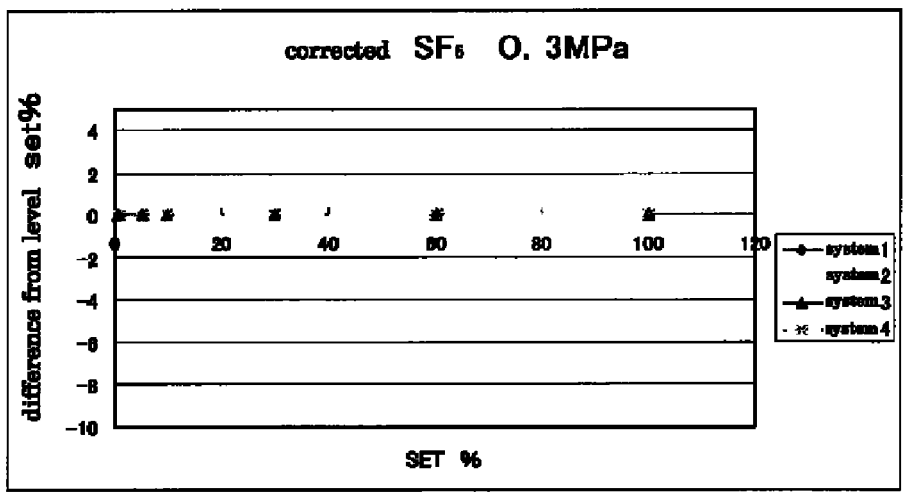
Figure 5:
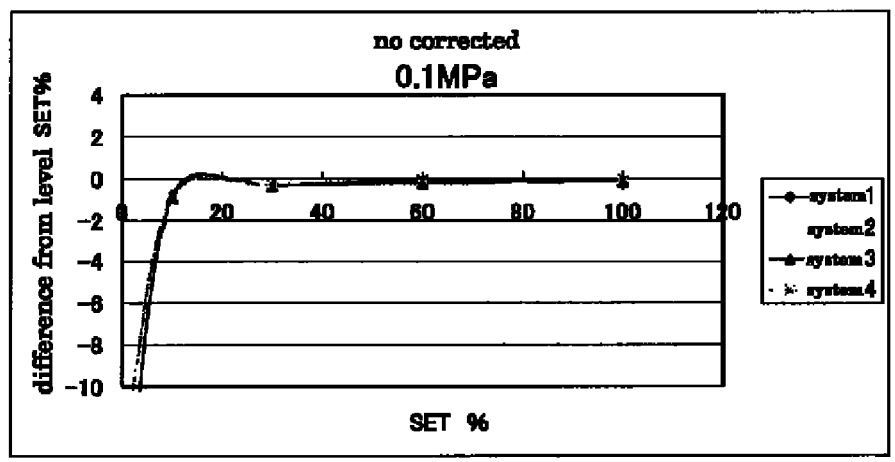
FIGS. 5(A), 5(B) and 5(C) are views showing a flow rate measurement data in the case that the error computing process operation is not executed.
Figure 5:
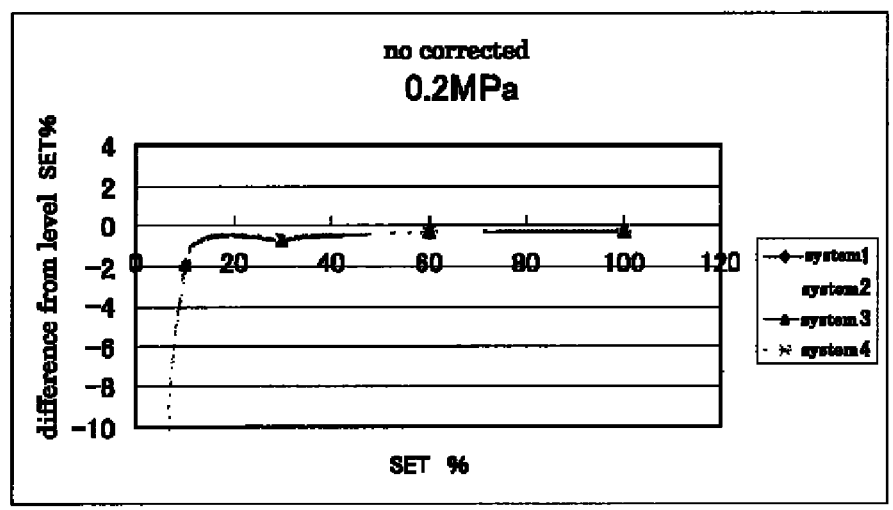
Figure 5:
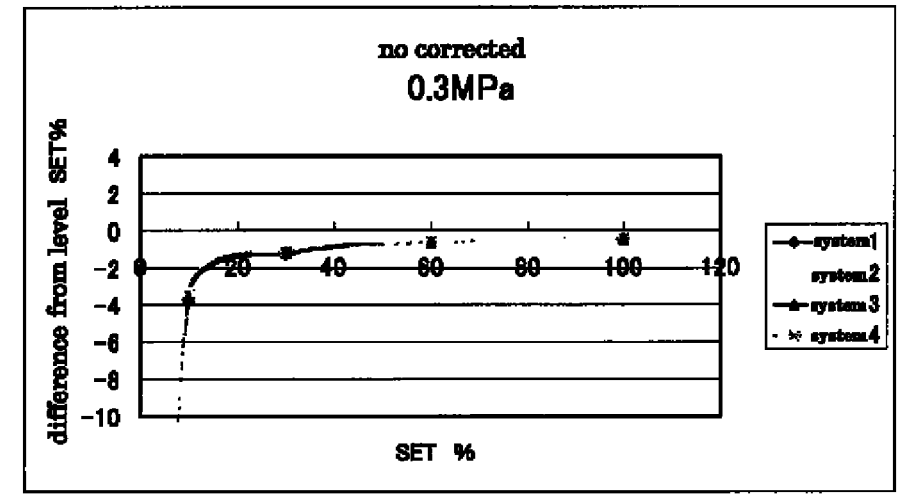
Figure 6:
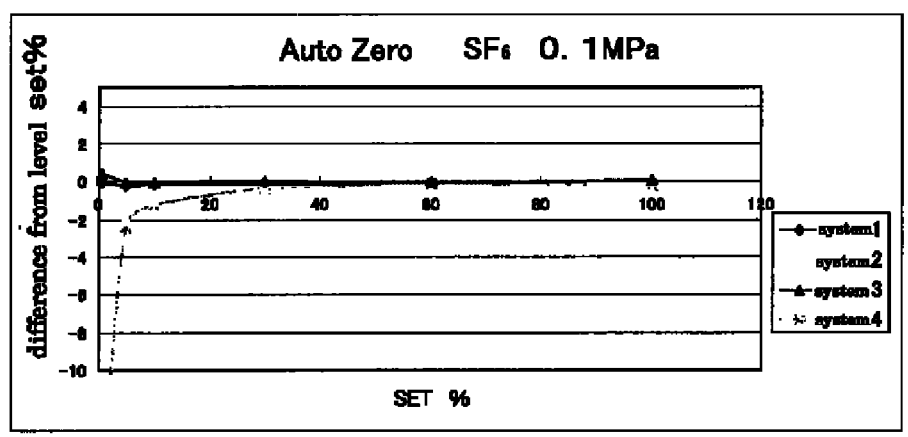
FIGS. 6(A), 6(B) and 6(C) are views showing a flow rate measurement data in the case that an auto zero process is executed.
Figure 6:
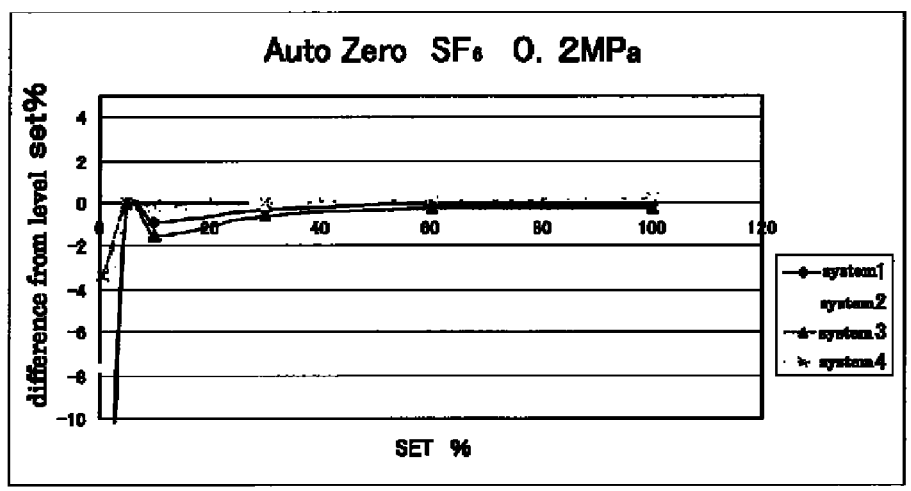
Figure 6:
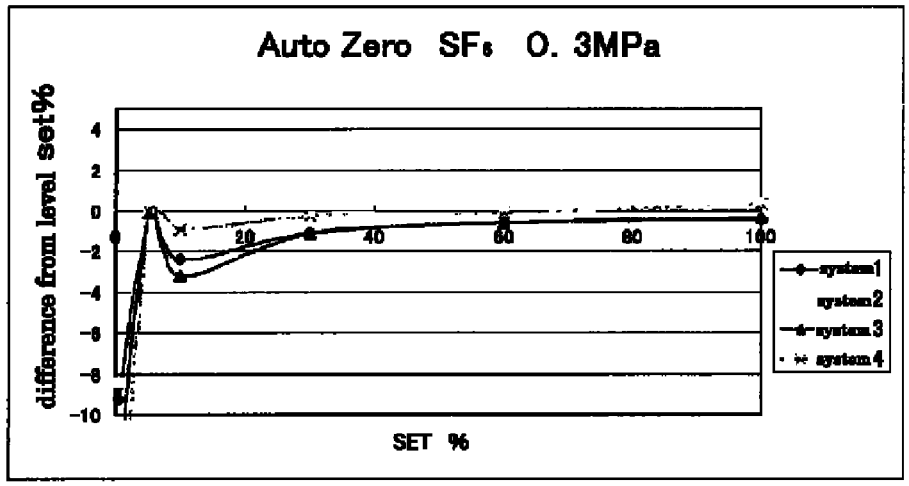

In this connection, FIGS. 4(A), 4(B) and 4(C) show a flow rate measurement data in the case of using $SF_6$ as the actual gas after carrying out the correction computing process operation mentioned above, and fluidizing the $SF_6$ under a pressure of 0.1 MPa, 0.2 MPa and 0.3 MPa, and FIGS. 5(A), 5(B) and 5(C) show a flow rate measurement data in the case of fluidizing the same gas as mentioned above under the same pressure without carrying out the correction computing process operation mentioned above. Further, FIGS. 6(A), 6(B) and 6(C) show a flow rate measurement data in the case of executing only a so-called auto zero process of carrying out a zero cancel by assuming the measurement value at a time of charging the actual gas as a zero point. In FIGS. 4, 5 and 6, there is shown a difference between the flow rate measurement data at a time of installing the main body block 1 in the vertical posture, and the flow rate measurement data at a time of installing in the horizontal posture without the influence of the thermal siphon phenomenon. In this case, the respective measurement data correspond to four series of measurement data shown by systems 1 to 4.

As is apparent from each of the flow rate measurement data, in the case of the present invention carrying out the electric previous correction computing process, an error rate (%) from the horizontal posture installing time is very small in comparison with the case of carrying out the auto zero process in addition to the case that the correction computing process is not carried out, whereby it is possible to confirm that a significant improvement of a predetermined flow rate control precision can be achieved by eliminating or widely lowering the measurement error caused by the influence of the thermal siphon phenomenon regardless of the installed posture.

Figure 7:
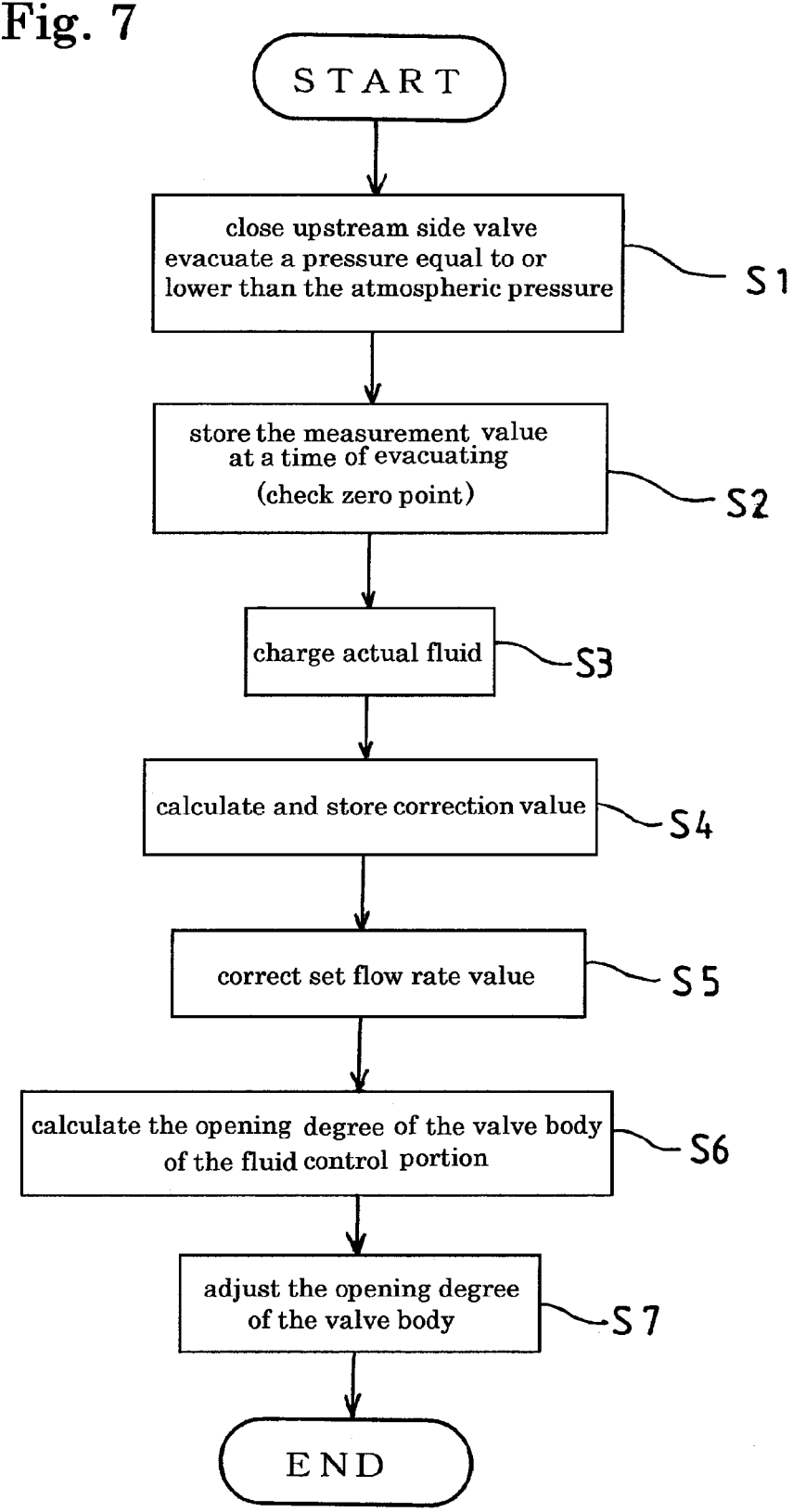
FIG. 7 is a flow chart explaining a set flow rate correction computing process operation.

In this case, in the embodiment mentioned above, the description is given of the process operation in the case of correcting the actual measurement flow rate value in the MFC by using the correction value calculated and stored by the correction computing process, however, it is possible to correct the set flow rate value of the fluid control portion 6 by using the correction value. The process operation in this case will be described alphabetically with reference to a flow chart shown in FIG. 7.

Figure 3:
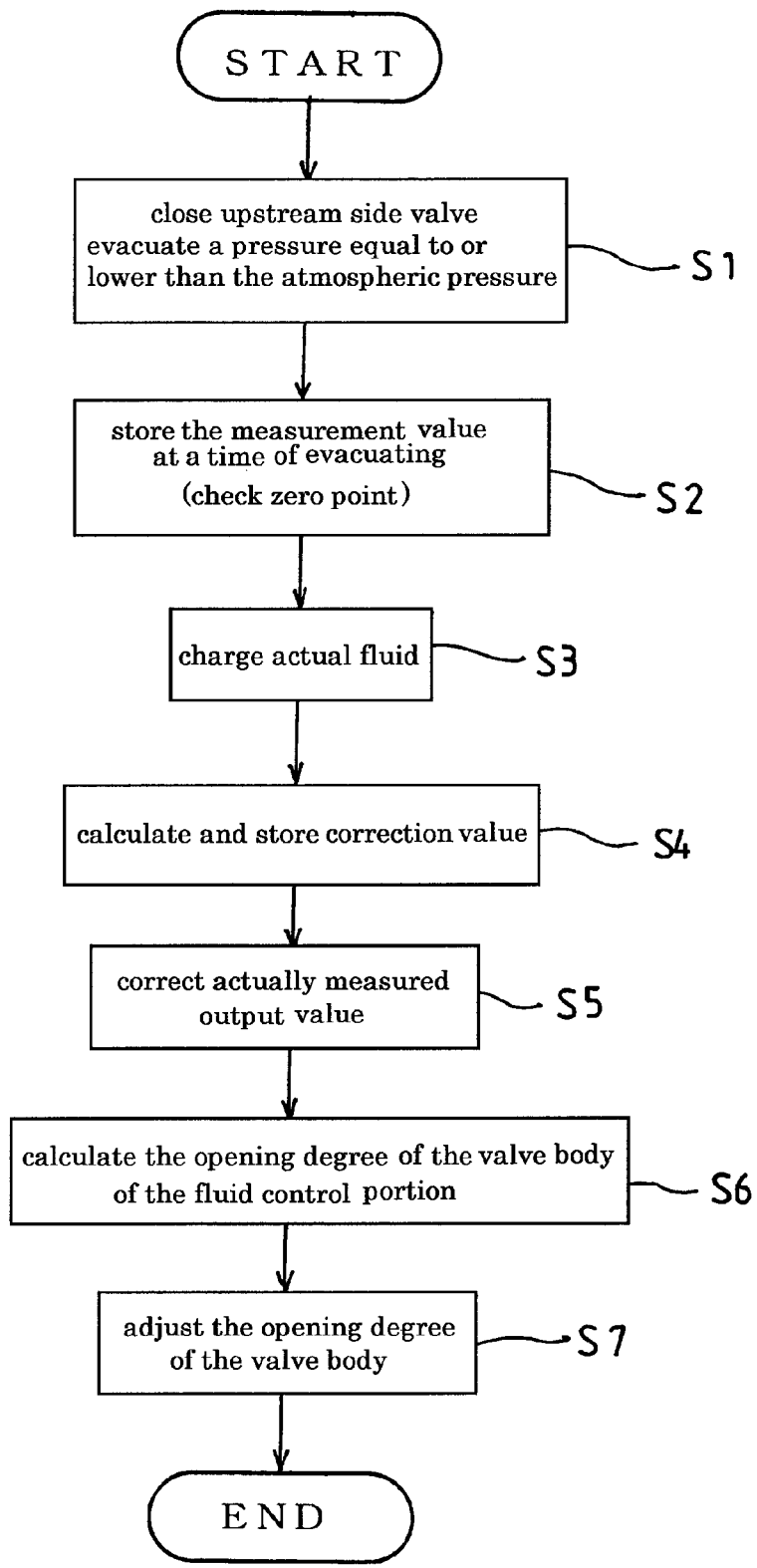
FIG. 3 is a flow chart explaining an actual flow rate correction computing process operation.

The step carries out the same operations as the operations in (1) to (4) from the evacuation (step S1) to the calculation of the flow rate correction value and the storage of the calculated correction value in the RAM 23 (step S4) in FIG. 3.

(5) After the correction computing process operation as mentioned above, the CPU 21 corrects the set flow rate value input to the fluid control portion 6 by the correction value read from the RAM 23 in the output correcting means 24 so as to output (step S5).

(6) Further, the CPU 21 calculates the opening degree of the valve body 16 of the fluid control portion 6 based on the correction set flow rate value output from the output correcting means 24 and input to the valve opening degree calculating means 30 and the actually measured flow rate value (the actually measured output value) (step S6), and corrects and controls the set flow rate value of the fluid control portion 6 by outputting to the piezo stack 17 serving as the valve body drive portion based on the result so as to adjust the opening degree of the valve body 16 (step S7).

Even at a time of correcting and controlling the set flow rate value of the fluid control portion 6, it is possible to reflect the ratio between the flow rate flowing in the fluid flow path 4 and the flow rate measuring conduit 11 and the flow rate flowing in the flow rate measuring conduit 11 in the parameter to the set flow rate correction for lowering the measurement error caused by the thermal siphon phenomenon by including the flow ratio, whereby it is possible to precisely carry out the set flow rate correction particularly in the small flow rate.

Figure 8:
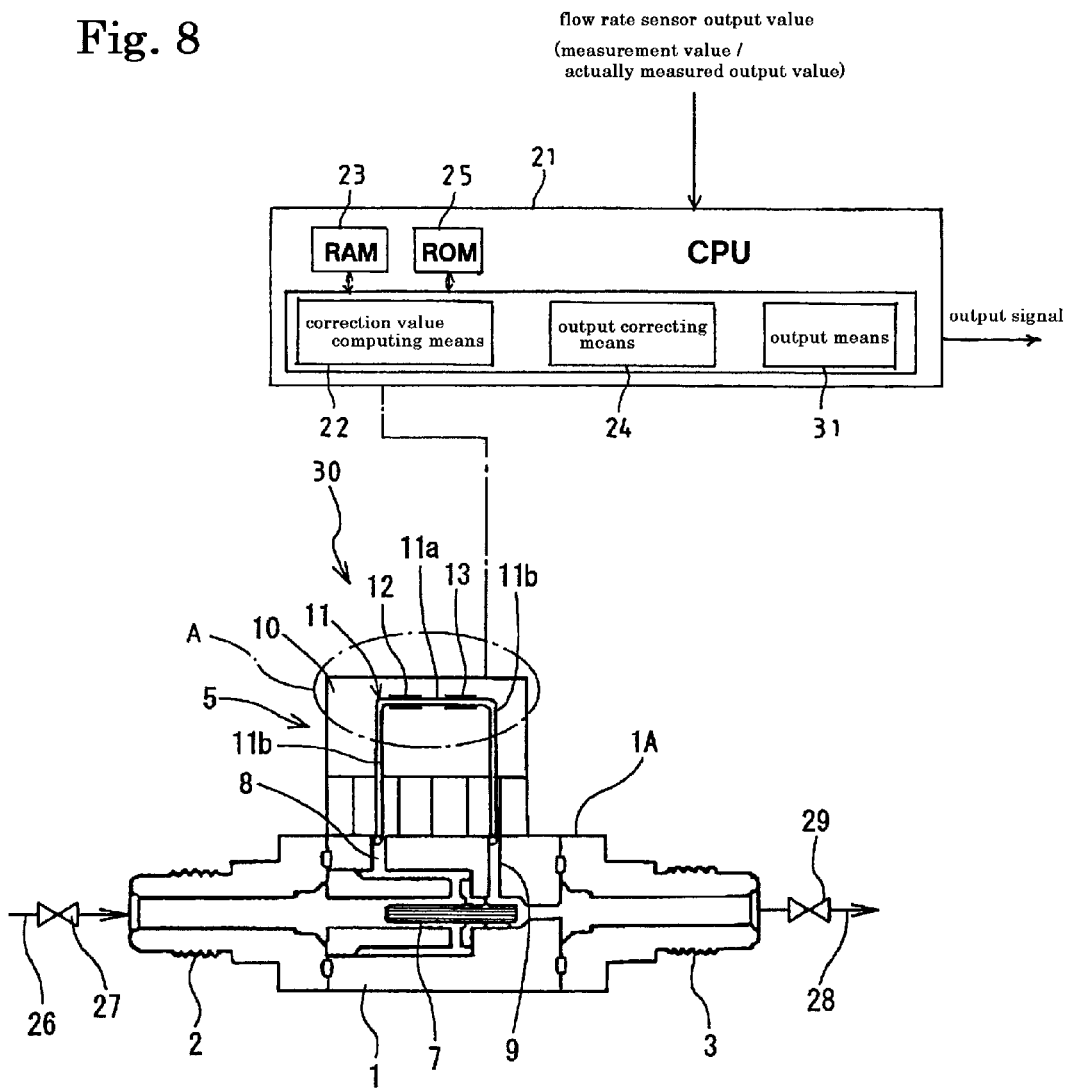
FIG. 8 is a vertical cross sectional view of a whole MFM in accordance with the present invention.

Further, in the embodiment mentioned above, the description is given of the structure and the operation of the MFC, however, even in an MFM 30 having a structure shown in FIG. 8 in which the fluid control portion is not provided, it is possible to achieve the same effect as mentioned above, that is, it is possible to eliminate or lower the measurement error caused by the influence of the thermal siphon phenomenon which is unavoidably generated at a time of installing and using the main body block 1 in the other postures than the horizontal posture such as the vertical posture, the inclined posture and the like, and there can be obtained the effect that it is possible to precisely measure the predetermined mass flow rate whatever installed posture the structure is used in, in spite of the structure in which the whole structure is made simple, compact and inexpensive, and the installed space is small.

In the MFM 30 shown in FIG. 8, the CPU 21 is provided with the correction value computing means 22, the RAM 23, the output correcting means 24, the ROM 25, and output means 31 for outputting the correction actually measured flow rate output value output from the output correcting means 24 to a display portion or a printer portion which are omitted to be illustrated, and the other structures are the same as those shown in FIG. 1. Accordingly, a detailed description thereof will not be repeated by attaching the same reference numerals to the corresponding structure elements.

Further, in the embodiment mentioned above, the description is given of the structure in which a pressure gauge is not attached to the MFC or the MFM, however, it is possible to use for the correcting computation or the output correction of a pressure indication value of the pressure gauge, in the MFC or the MFM having the pressure gauge built-in.

Further, the fluid control portion in the MFC may be provided in the upstream side in place of the downstream side of the fluid flow path (the flow rate sensor portion).

Further, at a time of installing and using in the inclined posture, an angle of installation may be input, or an angle sensor may be additionally provided and a sensor signal may be input.

INDUSTRIAL APPLICABILITY

Since the MFM and the MFC in accordance with the present invention are structured such as to lower the measurement error caused by the influence of the thermal siphon phenomenon so as to improve the flow rate measurement precision even in the case whatever posture the main body block is installed and used in, in spite that the whole structure can be structured simple, compact and inexpensive, the MFM and the MFC can be applied to the MFM and MFC used for measuring the flow rate of the fluid such as a reactive gas, a carrier gas or the like fed to various manufacturing processes, for example, a semiconductor manufacturing process, a liquid crystal manufacturing process and the like.

The invention claimed is:

1. A thermal type mass flow meter including a thermal type mass flow sensor portion which is additionally provided to a main body block having a fluid flow path in an inner portion and has a flow rate measuring conduit connected to the fluid flow path in a parallel manner and having a pair of thermal type sensors, further including:

means for storing a first measurement value of a flow rate of the fluid flow path and the flow rate measuring conduit at a time of depressurizing the fluid flow path and the flow rate measuring conduit to at least an atmospheric pressure or less and a second measurement value of a flow rate at a time of charging an actual fluid into the fluid flow path and the flow rate measuring conduit;

correction value computing means for calculating a correction value based on the stored first measurement value at the time of depressurizing the fluid flow path and the flow rate measuring conduit to at least an atmospheric pressure or less, a difference between the stored first measurement value and the stored second measurement value at the time of charging the actual fluid into the fluid flow path and the flow rate measuring conduit, a kind of the actual fluid, a pressure at a time of charging the actual fluid, and a flow ratio of the fluid flowing in the fluid flow path and the flow rate measuring conduit;

memory means for storing the correction value calculated by the correction value computing means; and output correcting means for correcting an actual measured output value at a time of flowing the actual fluid in the fluid flow path and the flow rate measuring conduit by the correction value read from the memory means.

2. A thermal type mass flow meter according to claim 1, wherein the mass flow meter includes a pressure gauge further.

3. A thermal type mass flow meter according to claim 2, wherein an output of the above pressure gauge is used for calculation of a correction value.

4. A thermal type mass flow control device including a thermal type mass flow sensor portion which is additionally provided to a main body block having a fluid flow path in an inner portion and has a flow rate measuring conduit connected to the fluid flow path in a parallel manner and having a pair of thermal type sensors, and a fluid control portion for controlling a fluid flow rate or a pressure which is provided in an upstream side or a downstream side of the fluid flow path, further including:

means for storing a first measurement value of a flow rate of the fluid flow path and the flow rate measuring conduit at a time of depressurizing the fluid flow path and the flow rate measuring conduit to at least an atmospheric pressure or less and a second measurement value of a flow rate at a time of charging an actual fluid into the fluid flow path and the flow rate measuring conduit;

correction value computing means for calculating a correction value based on the stored first measurement value at the time of depressurizing the fluid flow path and the flow rate measuring conduit to at least an atmospheric pressure or less, a difference between the stored first measurement value and the stored second measurement value at the time of charging the actual fluid into the fluid flow path and the flow rate measuring conduit, a kind of the actual fluid, a pressure at a time of charging the actual fluid, and a flow ratio of the fluid flowing in the fluid flow path and the flow rate measuring conduit;

memory means for storing the correction value calculated by the correction value computing means; and control means for controlling the fluid control portion based on the correction value which is read from the memory means, the set flow rate value, and an actual measured output value at a time of flowing the actual fluid in the fluid flow path and the flow rate measuring conduit.

5. A thermal type mass flow control device according to claim 4, wherein the mass flow meter includes a pressure gauge further.

6. A thermal type mass flow control device according to claim 5, wherein an output of the above pressure gauge is used for calculation of correction value.

7. A thermal mass flow meter system, attached to a fluid conduit having a main body block with a fluid flow path for measuring the flow of fluid, comprising, a mass flow sensor portion is operatively connected to the fluid flow path by a flow rate measuring conduit in a parallel manner, with a pair of thermal sensors monitoring fluid flow through the flow rate measuring conduit; and a control computing process portion is connected to the fluid flow path to receive a pressure measurement signal and the mass flow sensor portion to receive signals from the pair of thermal sensor, the control computing process portion is configured to provide, means for storing a first measurement value of a flow rate of the fluid flow path and the flow rate measuring conduit at a time of depressurizing the fluid flow path and the flow rate measuring conduit to at least an atmospheric pressure or less and a second measurement value of a flow rate at a time of charging an actual fluid into the fluid flow path and the flow rate measuring conduit;

correction value computing means for calculating a correction value based on the stored first measurement value at the time of depressurizing the fluid flow path and the flow rate measuring conduit to at least an atmospheric pressure or less, a difference between the stored first measurement value and the stored second measurement value at the time of charging the actual fluid into the fluid flow path and the flow rate measuring conduit, a kind of the actual fluid, a pressure at a time of charging the actual fluid, and a flow ratio of the fluid flowing in the fluid flow path and the flow rate measuring conduit;

memory means for storing the correction value calculated by the correction value computing means; and output correcting means for correcting an actual measured output value at a time of flowing the actual fluid in the fluid flow path and the flow rate measuring conduit by the correction value read from the memory means.

8. A thermal mass flow meter system according to claim 7, wherein the mass flow control device includes a pressure gauge further.

9. A thermal type mass flow meter system according to claim 8, wherein an output of the above pressure gauge is used for calculation of a correction value.

* * * * *